April 27, 1965 R. A. SMITH ETAL 3,181,071

APPARATUS FOR QUIETING PLATE PULSED UHF OSCILLATORS

Filed Aug. 20, 1962

INVENTORS.
RICHARD A. SMITH
THOMAS F. CHRISTY
THOMAS E. ADAMS

BY [signature]
ATTORNEY.

United States Patent Office 3,181,071

Patented Apr. 27, 1965

3,181,071

APPARATUS FOR QUIETING PLATE PULSED UHF OSCILLATORS

Richard A. Smith, Silver Spring, Thomas F. Christy, Takoma Park, and Thomas E. Adams, Silver Spring, Md., assignors to the United States of America as represented by the Secretary of the Navy Filed Aug. 20, 1962, Ser. No. 218,186
4 Claims. (Cl. 328—65)
(Granted under Title 35, U.S. Code (1952), sec. 266)

Figure 1:
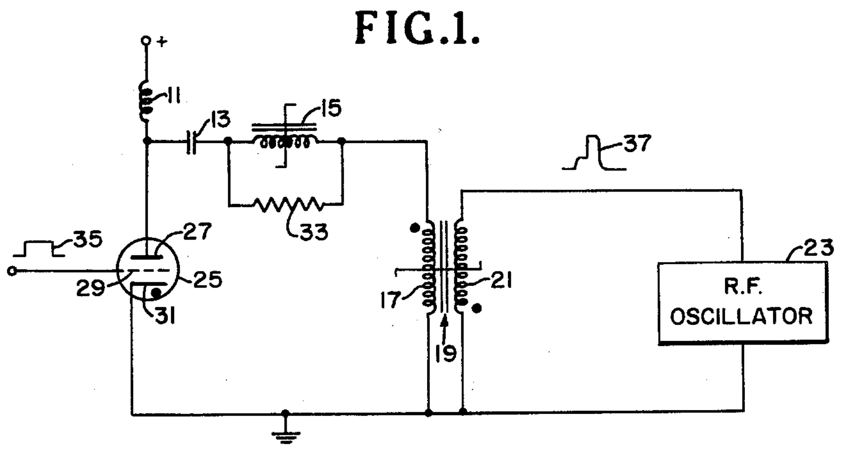

The invention described herein may be manufactured and used by or for the Government of the United States of America for governmental purposes without the payment of any royalties thereon or therefor.

This invention relates generally to a pulsed UHF oscillator and more particularly to an apparatus and method for quieting a pulsed UHF oscillator.

Various techniques have been employed in the past to provide a satisfactory means and method for pulsing UHF oscillators. An RF priming technique has been applied to a pulsed klystron circuit in which a first pulse was incorporated in a system in which the output of a second klystron, operating CW, was fed through a directional coupler into the first klystron. With this arrangement, quieting of the output pulses of the first klystron resulted. This RF priming technique, however, involves complex circuitry including the need for two klystrons in an oscillator circuit. Magnetic modulators have been employed for pulsing UHF oscillators, but such devices have in the past yielded noisy output pulses.

In the present invention a method and apparatus is disclosed for pulsing UHF oscillators in which quiet output pulses result. A basic magnetic modulator includes a capacitor charging circuit, a saturable core transformer and a saturable reactor. The method of modulation used in this invention includes pulsing the plate circuit of an oscillator with a pulse which has a plateau preceding the main body of the pulse. The duration of the plateau portion of the pulse is about the same length as the duration of the main body of the pulse.

An object of this invention is to provide a new and improved magnetic modulator for pulsing a UHF oscillator.

Another object of this invention is to provide a method of quieting pulsed oscillators by the application of a D.-C. plateau pulse thereto.

A further object of this invention is to provide a magnetic modulator for producing a D.-C. plateau voltage for quieting pulsed UHF oscillators.

A still further object of this invention is to apply a voltage pulse having a D.-C. plateau level to the plate circuit of an oscillator.

Yet another object is to provide a magnetic modulator having a D.-C. plateau voltage for application to the plate circuit of a Radio Frequency oscillator.

Figure 2:
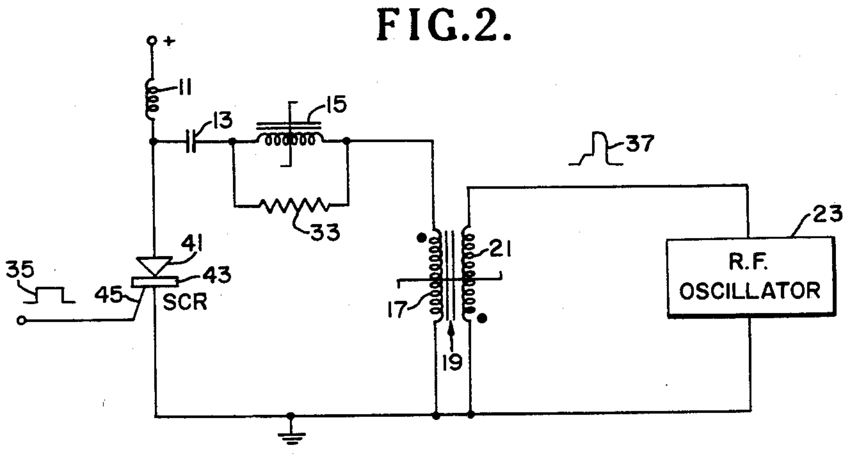

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 illustrates an embodiment of this invention in which a gas tube is used as a switch means; and FIG. 2 illustrates an embodiment of this invention in which a silicon controlled rectifier is used as a switch means.

Referring now to FIG. 1 of the drawing in which a preferred embodiment of the instant invention is illustrated a resonant charging circuit includes linear inductor 11 and capacitor 13. Capacitor 13 is connected to a source of positive voltage through inductor 11 and to ground through saturable reactor 15 in series with primary winding 17 of saturable core output transformer 19. The secondary winding 21 of saturable transformer 19 is connected to the plate circuit of an RF oscillator 23. RF oscillator 23 may be a cavity resonator oscillator for example, or it may be another type of oscillator such as a Colpitts oscillator. A switching element is shown in the form of a gas or thyratron type tube 25 having a plate 27 connected through linear inductor 11 to a source of positive voltage. The grid element 29 of tube 25 is connected to a source of input or trigger pulses. Cathode 31 of tube 25 is connected to ground. A resistor 33 is connected across the winding of saturable reactor 15.

In operation, capacitor 13 is charged through linear inductor 11, saturable core 15 and primary winding 17 of the saturable core output transformer 19. Starting from a zero charge, capacitor 13 is charged until it reaches maximum voltage. At the instant that the maximum voltage is reached across capacitor 13, an input or trigger pulse 35 is applied to grid 29 of thyratron tube 25 which fires the thyratron tube, forming a discharge path for the capacitor. The voltage across the capacitor is then divided between a load resistance seen at primary winding 17 of saturable core transformer 19 and resistor 33 which shunts saturable reactor 15. The voltage applied across primary winding 17 produces a low level output pulse at secondary winding 21 of the saturable core transformer which is applied to the plate circuit of RF oscillator 23. This voltage is the first step or plateau portion of output pulse 37. When reactor 15 saturates, shunt resistor 33 is effectively removed from the circuit and the full voltage of the capacitor is applied to primary winding 17 of the saturable core transformer and causes an increase in the magnitude of the voltage pulse produced in secondary winding 21 and an increase in the voltage applied to the plate circuit of RF oscillator 23 thereby causing oscillator 23 to produce an output pulse. The voltage pulse 37 produced across secondary winding 21 terminates as soon as the core of transformer 19 becomes saturated. At this point, capacitor 13 is effectively shorted out, removing the remaining charge from the capacitor. When the discharge of capacitor 13 is complete, the thyratron tube 25 is extinguished and the charging cycle again begins, charging capacitor 13 and resetting the cores of both saturable reactor 15 and saturable transformer 19.

In FIG. 2 of the drawing a D.-C. plateau priming modulator is shown which has the same circuit arrangement and the same circuit elements as that of FIG. 1 except that a silicon controlled rectifier SCR is used as a switching element instead of thyratron tube 25. Anode 41 of the rectifier SCR is connected to linear inductor 11 and cathode 43 is grounded. Control electrode 45 is adapted to be connected to a source of input or trigger pulses.

Obviously many modifications and variations of the present invention are possible in light of the above teachings. It is therefore to be understood, that within the scope of the appended claims, the invention may be practiced otherwise than as specifically described.

What is claimed as new and desired to be secured by Letters Patent of the United States is:

1. Apparatus for pulse modulating a radio frequency oscillator comprising a linear inductor, a capacitor, a saturable reactor having a shunting resistor, a saturable core transformer having a primary winding and a secondary winding, means serially interconnecting said linear inductor, said capacitor, said saturable reactor, and said primary winding between a source of positive voltage and a grounded terminal, said linear inductor and said capacitor having a common juncture terminal therebetween, switch means connected to said juncture terminal and said grounded terminal, said switch means having conducting states and non-conducting states whereby said capacitor may be charged during the non-conducting states and discharged during the conducting states of said switch means and a quieting pulse may be applied to the plate of the oscillator, said quieting pulse comprising a first portion having a reduced constant potential before said saturable reactor becomes saturated and a second portion having a full potential after said saturable reactor becomes saturated.

2. Apparatus as in claim 1 wherein the switch means is a gas tube.

3. Apparatus as in claim 1 wherein the switch means is a silicon controlled rectifier.

4. Apparatus for producing quiet output pulses for a pulse modulated oscillator comprising a capacitor having a charging circuit whereby a voltage charge may be placed on said capacitor, a capacitor discharge circuit including a saturable reactor having a shunting resistor and a primary winding of a saturable core transformer serially connected thereto, whereby a portion of said voltage charge having a reduced constant potential is applied across said primary winding when said saturable core is unsaturated and the voltage charge is totally applied across said primary winding when said saturable reactor becomes saturated, said transformer having a secondary winding, and means connecting said secondary winding to a plate circuit of said oscillator.

References Cited by the Examiner

UNITED STATES PATENTS

| | | | |
|---|---|---|---|
| 2,392,380 | 1/46 | Varian | 315—5.42 |
| 2,787,755 | 4/57 | Smith | 307—88 X |
| 2,835,811 | 5/58 | Bruyning | 307—88 X |

ARTHUR GAUSS, *Primary Examiner.*